United States Patent [19]

Winston

[11] 4,123,980
[45] Nov. 7, 1978

[54] ROOT FEEDER

[76] Inventor: Emanuel A. Winston, 190A Skokie Valley Rd., Highland Park, Ill. 60035

[21] Appl. No.: 751,257

[22] Filed: Dec. 17, 1976

[51] Int. Cl.² .................. A01C 15/02; A01C 5/02
[52] U.S. Cl. .................................. 111/92; 111/95
[58] Field of Search .......................... 111/7.1–7.4, 111/92, 95, 99; 47/48.5, 57.5; 222/175, 191, 556

[56] References Cited

U.S. PATENT DOCUMENTS

| | | | |
|---|---|---|---|
| 58,486 | 10/1866 | Safford | 111/95 |
| 467,074 | 1/1892 | Anderson et al. | 222/175 X |
| 489,167 | 1/1893 | Shaw et al. | 111/7.2 |
| 1,054,485 | 2/1913 | Archard | 47/57.5 X |
| 2,354,619 | 7/1944 | Smith | 222/556 X |
| 2,718,856 | 9/1955 | Gathercoal | 111/7.1 |
| 2,737,318 | 3/1956 | Molinare | 111/7.1 X |
| 2,808,013 | 10/1957 | Dean | 111/7.1 |
| 2,860,586 | 11/1958 | Nozell | 111/7.1 X |
| 3,107,638 | 10/1963 | Johnston | 111/7.1 |
| 3,260,417 | 7/1966 | Paxson | 111/7.2 X |
| 3,340,833 | 9/1967 | Ford | 111/95 |

FOREIGN PATENT DOCUMENTS

| | | | |
|---|---|---|---|
| 147,576 | 7/1952 | Australia | 111/95 |
| 911,555 | 4/1954 | Fed. Rep. of Germany | 111/92 |
| 916,122 | 11/1946 | France | 111/99 |
| 457,164 | 5/1950 | Italy | 222/556 |
| 15,237 | 9/1901 | Sweden | 111/92 |
| 15,123 | 4/1902 | Sweden | 111/95 |
| 883,371 | 11/1961 | United Kingdom | 222/175 |

Primary Examiner—Edgar S. Burr
Assistant Examiner—Steven A. Bratlie
Attorney, Agent, or Firm—Stein & Frijouf

[57] ABSTRACT

An apparatus is disclosed for depositing a growth altering material such as fertilizer to a plant rooted in soil. The apparatus includes a body member having a handle member extending relative thereto. A digging element extends from the body member having a substantially shovel-like region for digging into the soil upon application of a force on the handle member. A hopper for storing the fertilizer is secured relative to the body member. Gate means is provided in the hopper for containing the fertilizer in the hopper when the gate is in a first position and for liberating the growth altering material in proximity to the digging element when the gate is in a second position. A foot member secured to the body member in a substantially orthogonal relationship may be provided for facilitating digging into the soil. The gate means may be operated by a hand lever secured to the handle member and connected by a flexible cable extending through the body member to the gate means. The foregoing abstract is merely a resume of one general application, is not a complete discussion of all principles of operation or applications, and is not to be construed as a limitation on the scope of the claimed subject matter.

1 Claim, 6 Drawing Figures

U.S. Patent  Nov. 7, 1978  4,123,980
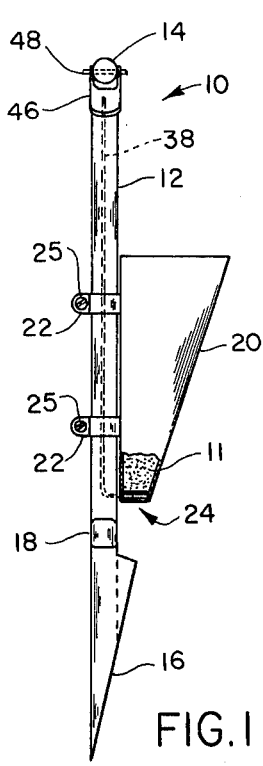
FIG. 1
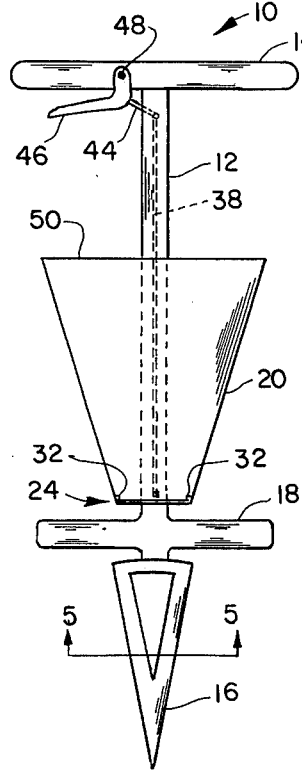
FIG. 2
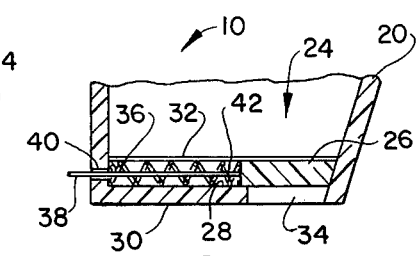
FIG. 3
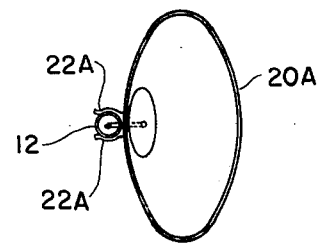
FIG. 8
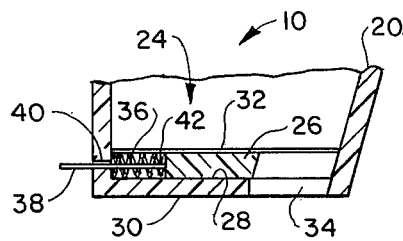
FIG. 4
FIG. 5
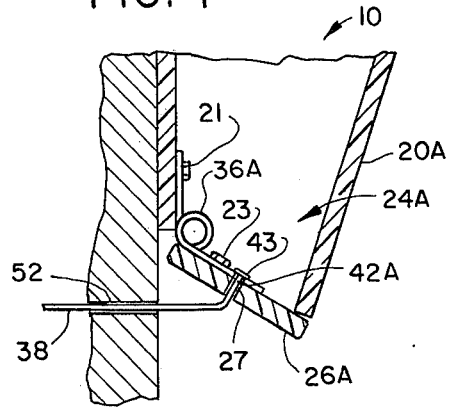
FIG. 7
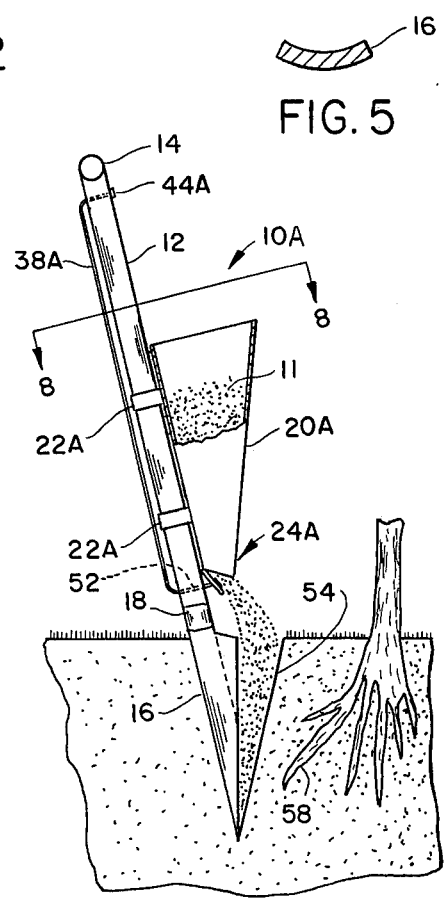
FIG. 6

ROOT FEEDER

BACKGROUND OF THE INVENTION

1. Field of the Invention

This invention relates to plant husbandry and more particularly to plant irrigators and/or fertilizers and injection.

2. Description of the Prior Art

Root feeding devices and aerator devices for introducing a growth altering material to a rooted plant have been known to the prior art in various configurations. The prior art root feeding devices have appeared as very simple structures and as very complicated structures each being designed for a specific task. Unfortunately, the simpler prior art root feeding devices have not met the specific needs of the prior art root feeding applications. A basic root feeding device must be simple and inexpensive for enabling an average consumer to purchase the device even if it is only occasionally used by the consumer. Irrespective of the low costs and simplicity, the device must have a strong body member and a digging element for generating a hole in the soil for depositing the growth altering material therein. The device must be easy to operate and adapted for digging into soft and hard soil. Many of the growth altering materials used for feeding a rooted plant are of a corrosive nature and accordingly a non-corrosive hopper for storing the growth altering material would be a desirable inclusion for the device. The device should also have simple means for controlling the flow of the growth altering material from the hopper into the hole in the soil formed by the digging element.

The prior art has not produced an apparatus for depositing a growth altering material into a plant rooted in soil which has the aforementioned desirable characteristics and which may be produced in quantity at a reasonable cost.

Therefore it is an object of this invention to provide an apparatus which overcomes the aforementioned inadequacies of the prior art devices and provides an improvement which is a significant contribution to the advancement of the pertinent art.

Another object of this invention is to provide an apparatus for depositing a growth altering material to a plant rooted in soil comprising a body member having a handle member extending relative to the body member with a digging element extending from the body member having a substantially shovel-like region for digging into the soil upon application of a force to the handle member.

Another object of this invention is to provide an apparatus for depositing a growth altering material to a plant rooted in soil having a hopper for storing the growth altering material and gate means connected to the hopper for containing the growth altering material in the hopper when the gate means is in a first position and for liberating the growth altering material in proximity to a digging element when the gate means is in a second position.

Another object of this invention is to provide an apparatus for depositing a growth altering material to a plant rooted in soil including a hopper for storing the growth altering material secured relative to a body member of the apparatus with gate means movably mounted relative to the hopper between a first and a second position for controlling the flow of growth altering material therefrom with urging means coacting between the gate means and the hopper for biasing the gate means to contain the growth altering material within the hopper.

Another object of this invention is to provide an apparatus for depositing a growth altering material to a plant rooted in soil including a handle member, a hopper with gate means secured relative to the hopper and flexible cable means interconnecting the gate means and the handle for controlling the position of the gate and accordingly controlling the flow of the growth altering material from the hopper.

SUMMARY OF THE INVENTION

The invention may be incorporated into an apparatus for depositing a growth altering material to a plant rooted in soil comprising a body member and a handle member extending relative to the body member. A digging element extends from the body member having a substantially shovel-like region for digging into the soil upon application of a force to the handle member. A hopper for storing the growth altering material is secured relative to the body member. Gate means is connected to the hopper for containing the growth altering material in the hopper when the gate means is in a first position and for liberating the growth altering material in proximity to the digging element when the gate means is in a second position.

The handle member may be secured to one end of the body member in a substantially orthogonal relationship. A foot member may be provided and secured to the body member in a substantially orthogonal relationship in proximity to the digging element.

The gate means in one embodiment includes a gate movably mounted relative to the hopper between a first and a second position with urging means coacting between the gate and the hopper for biasing the gate into the first position. The gate opening means may have at least a portion thereof located in proximity to the handle member and connected for controlling movement of the gate means between the first and second position. An embodiment of the invention may include the gate opening means including a flexible connector having a first and a second end with the first end thereof connected to the gate and with the second end of the flexible member connected in proximity to the handle member. The flexible connector may be disposed through an aperture in the body member.

The invention may include a movable hand member mounted relative to the handle member and connected for controlling the gate means between the first and second position.

This invention accordingly comprises an apparatus possessing the features, properties and the relation of elements which will be exemplified in the article hereinafter described and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side elevational view of a first embodiment of the instant invention;

FIG. 2 is a front elevational view of the invention shown in FIG. 1;

FIG. 3 is a magnified view of a portion of the invention shown in FIG. 1 with a gate shown in the closed position;

FIG. 4 is a magnified view of a portion of the invention shown in FIG. 1 with a gate shown in the open position;

FIG. 5 is a sectional view along line 5—5 of the invention shown in FIG. 2;

FIG. 6 is a side elevational view of a second species of the instant invention in the process of depositing a growth altering material to a plant rooted in soil;

FIG. 7 is a magnified sectional view of a portion of the invention shown in FIG. 6; and FIG. 8 is a sectional view along line 8—8 of FIG. 5.

Similar reference characters refer to similar parts throughout the several views of the drawings.

DETAILED DESCRIPTION

FIGS. 1-4 illustrate various views of a first species of an apparatus 10 for depositing a growth altering material 11 as a plant fertilizer or a plant herbicide to a plant rooted in soil. The apparatus includes a body member 12 preferably made of a rigid metallic material such as steel or aluminum. The body member 12 may be tubular for accommodating a flexible cable as shown in FIGS. 1 and 2 and as will be hereinafter described. A handle member 14 extends relative to the body member 12 and may be permanently secured by welding or the like or may be removably mounted by threaded fasteners as is well known in the art. The handle member 14 forms an orthogonal relationship with the body member 12 at one end thereof.

A digging element 16 shown as having a substantially shovel-like region extends from the lower end of the body member 12 as shown in FIGS. 1 and 2. FIG. 5 is a partial sectional view along line 5—5 showing the shovel-like region of the digging element 16 without showing the remainder of the apparatus 10. In this embodiment, the digging element 16 is shown secured to the body member 12 as an integral member but it is understood that the digging element may be secured relative to the body member of the means such as threaded fasteners, welding or the like.

A foot member 18 is secured to the body member 12 in a substantially orthogonal relationship at the lower end of the body member 12. The foot member 18 enables an operator to exert pressure along the longitudinal dimension of the body member 12 by both the hand member 14 and the foot member 18. The foot member 18 and the digging element 16 are preferably made of a rugged metallic material such as steel or aluminum. The foot member 18 may be secured to the body member as an integral member or may be secured by threaded fasteners, welding or the like.

The invention includes a hopper 20 for storing the growth altering material 11 which is secured to the body member 12 by clamps 22. The hopper 20 is shown as a molded plastic container. The clamps 22 may include threaded means shown as screws 25 for removably mounting the hopper 20 relative to the body member 12. Gate means shown generally as 24 in FIGS. 1 and 2 and shown more particularly in FIGS. 3 and 4 is connected to the hopper 20 for maintaining the growth altering material 11 in the hopper 20 when the gate means 24 is in a first position as shown in FIG. 3 and for liberating the growth altering material 11 in proximity to the digging element 16 when the gate means 24 is in a second position as shown in FIG. 4. The gate means 24 more specifically includes a gate 26 movably mounted relative to hopper 20 and in this embodiment is shown slidably mounted between an upper surface 28 of a bottom member 30 of the hopper 20 and a guide protrusion 32. The protrusions 32 are molded on opposed inside surfaces of the hopper 20 as shown in FIG. 2. The gate 26 is movable between the first position shown in FIG. 3 and the second position shown in FIG. 4 to enable the material 11 to fall through an orifice 34 in the bottom of the hopper.

Urging means shown as a spring 36 biases the gate 26 into the first position shown in FIG. 3. A flexible connector cable 38 extends through an aperture 40 in the hopper 20 for controlling the position of the gate 26 between the first and second positions. A first end 42 of the flexible cable 38 is connected to the gate 26 whereas a second end 44 is connected to a lever 46 pivotably mounted relative to handle member 14 on pivot pin 48.

The growth altering material 11 may be loaded into hopper 20 through an open aperture 50 on the top of the hopper 20. Pressure exerted on the handle member 14 and the foot member 18 causes the digging element 16 to dig into the soil as shown in FIG. 6 to create a hole 54 for receiving the growth altering material 11. Movement of lever 46 in a clock-wise direction about pivot 48 causes the gate 26 to move from the first position into the second position shown in FIG. 4 enabling the material 11 to fall into the hole 54 formed by the digging element.

FIGS. 6-8 illustrate a second species of the instant invention with similar parts being identified by similar numbers followed by the character "A". The apparatus 10A includes an identical body member 12, handle member 14, digging elements 16 and foot member 18. It should be noted that the body member 12 in this embodiment is shown as a solid member. In this embodiment, the hopper 20A which is shown as having an oval cross section is secured to the body member 12 by clamps 22A shown in greater detail in FIG. 8 wherein the clamps 22A are biased into a snap locking engagement with the body member 12. Accordingly, the hopper 20A may be quickly removed from the body member 12.

In this embodiment, the gate means shown generally as 24A in FIG. 6 and in more detail in FIG. 7 comprises a gate 26A which is pivotably mounted relative to the hopper 20A between a first position shown in FIG. 7 and a second position shown in FIG. 6. Urging means 36A shown as a spring interconnects the hopper 20A with the gate 26A by mounting elements 21 and 23 respectively. Accordingly, the spring 36 provides the pivot between the gate 26A and hopper 20A in addition to biasing the gate 26A into the first position as shown in FIG. 7. Gate 26A includes an aperture 27 for receiving a first end 42A of a flexible cable 38A by a fastening member 43 which may be a knot in the cable or a detachable or permanent fastener. The second end 44A of cable 38A is secured in proximity to handle membler 14 with the cable 38A extending through an aperture 52 in the body member 12.

In the embodiment shown in FIGS. 68 the manual pulling of cable 38 causes a clock-wise rotation of gate 26A about spring 36A to release the material 11 as shown in FIG. 6 to fall into the hole 54 in the soil for feeding the roots 50. In the embodiment shown in FIGS. 6-8 it, can be appreciated that the hopper 20A may be readily removed from the body member 12 by releasing the second end 44A of cable 38 from the body member 12 and unsnapping clamps 22A from the body member 12. Accordingly, the apparatus 10A may then be used as a pointed shovel, a weed digger or the like.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. An apparatus for depositing a growth altering material to a plant rooted in soil, comprising in combination:
    a body member having a body aperture extending axially therethrough;
    a handle member secured to one end of said body member and extending relative to said body member in a substantially orthogonal relationship;
    a foot member secured to the other end of said body member and extending relative to said body member in a substantially orthogonal relationship;
    a digging element extending from said body member having a substantially shovel-like region for digging into the soil upon application of a force on said handle member and said foot member;
    a hopper for storing the growth altering material secured to said body member;
    said hopper comprising hopper side walls tapering from a large open top to a partially open bottom;
    a gate slideably mounted relative to said partially open bottom of said hopper for containing the growth altering material in said hopper when said gate is in a first position and for liberating the growth altering material in proximity to said digging element when said gate is in a second position;
    urging means coacting between said gate and said hopper for biasing said gate into said first position;
    guide protrusions being a single unit with said hopper and extending from opposed inside walls of said hopper for slideably mounting said gate between said guide protrusions and the top surface of said partial bottom;
    a flexible connector having a first and a second end;
    a movable lever mounted on said handle member; and
    said flexible connector extending through said body aperture and having said first end connected to said gate and said second end connected to said movable lever to enable movement of said gate between said first and second positions in response to actuation of said movable lever.

* * * * *